(12) United States Patent
Woods, II et al.

(10) Patent No.: US 9,028,944 B2
(45) Date of Patent: May 12, 2015

(54) STITCHED MULTI-LAYER FABRIC

(75) Inventors: William Thomas Woods, II, Lantana, TX (US); Douglas Stanley Lumb, Methuen, MA (US); Daniel L. English, Pagosa Springs, CO (US)

(73) Assignee: SWNR Development, LLC, Pagosa Springs, CO (US)

( * ) Notice: Subject to any disclaimer, the term of this patent is extended or adjusted under 35 U.S.C. 154(b) by 321 days.

(21) Appl. No.: 13/529,862

(22) Filed: Jun. 21, 2012

(65) Prior Publication Data

US 2013/0255557 A1 Oct. 3, 2013

Related U.S. Application Data

(63) Continuation-in-part of application No. 13/435,854, filed on Mar. 30, 2012, now Pat. No. 8,597,760.

(51) Int. Cl.
*B32B 7/08* (2006.01)

(52) U.S. Cl.
CPC .................................. *B32B 7/08* (2013.01)

(58) Field of Classification Search
CPC ................................... B32B 5/06; B32B 7/08
USPC ........................... 428/102–104; 112/439, 402
See application file for complete search history.

(56) References Cited

U.S. PATENT DOCUMENTS

| 891,594 | A | * | 6/1908 | Cornely | 112/410 |
| 2,372,632 | A | * | 3/1945 | Webb | 428/104 |
| 5,885,679 | A | * | 3/1999 | Yasue et al. | 428/57 |

* cited by examiner

*Primary Examiner* — Alexander Thomas
(74) *Attorney, Agent, or Firm* — Conley Rose, P.C.; William H. Dietrich (57) ABSTRACT

A stitched fabric including a barrier layer configured to inhibit fluid flow and a yarn stitched through and forming stitch holes in the barrier layer. The yarn and the barrier layer are free from contact by another layer on either side of the barrier layer. As such, the stitched fabric may be employed as a wearable fabric for a garment without the need for, for example, a separate face layer and a separate interior layer.

19 Claims, 8 Drawing Sheets

STITCHED MULTI-LAYER FABRIC

This application is a continuation in part of, and claims priority to, U.S. patent application Ser. No. 13/435,854, now U.S. Pat. No. 8,597,760, entitled "Stitched Multi-Layer Fabric," filed on Mar. 30, 2012, which is incorporated herein by reference.

BACKGROUND

Textile manufacturers, garment makers, and others in similar industries have a continuing goal of creating or making available to consumers the most comfortable product for the intended end use.

Several factors, either alone or in combination, may affect the overall comfort of a particular product. These factors may include, but are not limited to, whether or to what extent the product is air permeable, breathable, water resistant or waterproof, or stretchable.

In an attempt to provide or maximize these qualities, the product may be manufactured using certain fabrics. The fabrics may be chosen for their inherent qualities (e.g., naturally breathable, etc.) or may be amenable to certain processes (e.g., waterproofing, etc.) so they will improve the comfort of the finished product.

Despite the above, making or providing a product that performs well in each category of permeability, breathability, water resistance, and stretch and, therefore, provides a high level of comfort, has proven to be a challenge.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Figure 1:
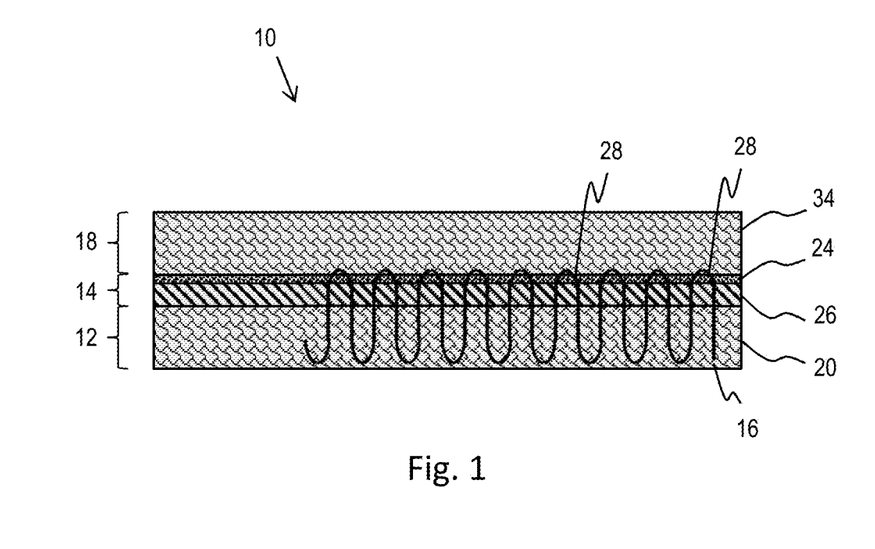
FIG. 1 is a cross section of an embodiment of a stitched multi-layer fabric having a barrier layer formed from and adhesive and a membrane or a film.

Referring to FIG. 1, an embodiment stitched fabric 10 is illustrated. As will be more fully explained below, the fabric 10 provides good breathability, water and wind resistance, and stretch. Therefore, the fabric 10 may have a variety of suitable uses (e.g., in a garment suitable for outdoor use, in a medical bandage, in a blanket for people or animals, etc.). In those instances where used in a garment, the fabric 10 provides a high level of comfort for the wearer. As shown in FIG. 1, the fabric 10 generally includes an interior layer 12, a barrier layer 14, a yarn 16, and a face layer 18.

The interior layer 12 is a knitted, woven, or non-woven fabric 20 formed using natural fibers (e.g., cotton, wool, silk, linen, etc.), synthetic fibers (e.g., nylon, polyester, etc.), or a blend of natural and synthetic fibers. In an embodiment, the interior layer 12 is a light-weight, durable, machine-washable fabric 20 with multi-direction stretch and good hand (e.g., feel). In an embodiment, the interior layer 12 provides horizontal and vertical stretch of thirty percent (30%) or more. In an embodiment, the interior layer 12 provides horizontal and vertical stretch of fifteen percent (15%) or more. When used in a garment, the interior layer 12 is generally oriented to engage or face toward the wearer.

Still referring to FIG. 1, the barrier layer 14 is configured to inhibit fluid flow. In other words, the barrier layer 14 is generally water resistant or waterproof. Therefore, the barrier layer 14 functions to discourage fluid flow through the fabric 10. In addition, in an embodiment the barrier layer 14 is also windproof, yet still permits the fabric 10 to be breathable. In other words, the barrier layer 14 is able to block wind from undesirably passing through the fabric 10 while still permitting moisture vapor generated by, for example, body heat to be dissipated. In an embodiment, the barrier layer 14 is stretchable or suitably elastomeric in order to compliment the degree of stretch afforded by the interior layer 12 and the face layer 18.

In an embodiment, the barrier layer 14 comprises an adhesive 24 and an intermediate material 26 (e.g., a porous membrane or a non-porous film) as shown in FIG. 1. In an embodiment, the barrier layer 14 may include several adhesive 24 layers and/or several intermediate layers 26.

A melting point of the adhesive 24 is generally lower than a melting point of the intermediate material 26. Therefore, the adhesive 24 may be melted without also melting the intermediate material 26. In other words, the adhesive 24 may be forced to flow through the application of sufficient heat without flowing, or compromising the integrity of, the intermediate material 26.

In an embodiment, the melting point of the adhesive 24 may be between about 140° C. to about 180° C. (about 284° F. to about 356° F.) while the melting point of the intermediate material 26 exceeds about 180° C. (about 356° F.). Where the adhesive 24 and the intermediate material 26 have different distinct melting points as noted above, the barrier layer 14 may be referred to as having an "A-B" type format. In an embodiment, the adhesive 24 is approximately two thousandths of an inch (i.e., 2 mils) and the intermediate material 26 is approximately one thousandth of an inch (i.e., 1 mil).

In general, the adhesive 24 is a thermoplastic, copolyamide, or other suitably meltable type of material capable of bonding two layers of fabric together. A variety of different adhesives 24 may be used in the barrier layer 14. By way of example, the adhesive 24 may be a high-quality textile adhesive such a polyurethane adhesive film, an ethylene-vinyl acetate, and the like. In an embodiment, the adhesive 24 may be heat sensitive, pressure sensitive, or both.

The intermediate material 26 of the barrier layer 14 may be either a membrane or a film formed from a variety of different materials. In an embodiment, the intermediate material 26 is formed from polyurethane, polyester, urethane, polyether, polytetrafluoroethylene (PTFE), or another polymer-based material. The intermediate material 26 may be manufactured using, for example, an extrusion, a melt blowing, or an electrospinning process.

Figure 2:
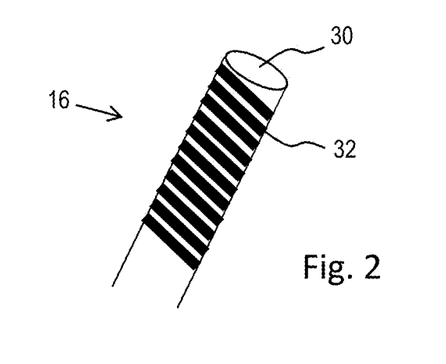
FIG. 2 is a perspective view of an embodiment yarn used in the fabric of FIG. 1.

As shown in FIG. 1, the interior layer 12 and the barrier layer 14 are stitched together with the yarn 16. As such, the yarn 16 secures the interior layer 12 and barrier layer 14 together. In an embodiment the yarn 16 is non-contractible. As shown in FIG. 2, in another embodiment the yarn 16 is contractible. In such an embodiment, the yarn 16 may be formed by wrapping nylon 30 around spandex 32 (e.g., Lycra®, elastane, etc.). A conventional covering process may be employed to perform the wrapping process. In another embodiment, materials other than nylon 30 and spandex 32 may be used.

In an embodiment, the yarn 16 has approximately seventeen turns per inch (17 TPI) (i.e., the nylon 30 is wrapped around the spandex 32 approximately seventeen times every inch). In an embodiment, the nylon 30 is wrapped around the spandex 32 while the spandex has a draft of approximately two and a half times (i.e., the spandex 32 has been stretched to two and a half times its original length). In an embodiment, the spandex 32 is a forty (40) denier fiber.

During the stitching process, the yarn 16 forms stitch holes 28 through the interior layer 12 and the barrier layer 14 as shown in FIG. 1. As will be more fully explained below, some or all of the stitch holes 28 are partially or fully filled when the barrier layer 14 is sufficiently heated. For example, the adhesive 24 of the barrier layer 14 may be heated to a thermoplastic state, which allows a portion of the adhesive to flow and plug a portion of the stitch holes 28 in the barrier layer 14.

The face layer 18 is a knitted, woven, or non-woven fabric 34 formed using natural fibers (e.g., cotton, wool, silk, linen, etc.), synthetic fibers (e.g., nylon, polyester, etc.), or a blend of natural and synthetic fibers. In an embodiment, the face layer 18 is a light-weight, durable, machine-washable fabric 34 with multi-direction stretch and good hand (e.g., feel). In an embodiment, the face layer 18 provides horizontal and vertical stretch of thirty percent (30%) or more. In an embodiment, the face layer 18 provides horizontal and vertical stretch of between about fifteen percent (15%) and about forty-five percent (45%). When used in a garment, the face layer 18 generally faces away from the wearer. In an embodiment, the face layer 18 and the interior layer 12 are formed from the same or a substantially similar fabric. In another embodiment, the face layer 18 and the interior layer 12 are formed from different types of fabric.

Figure 3:
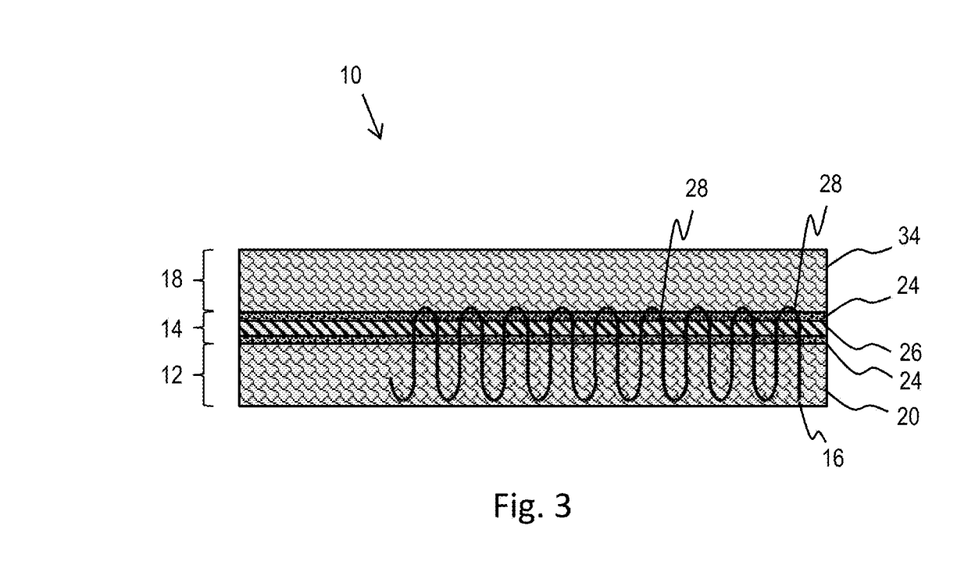
FIG. 3 is a cross section of an embodiment of the stitched multi-layer fabric of FIG. 1 where the barrier layer includes adhesive on opposing sides of the membrane or the film.

Referring now to FIG. 3, in an embodiment the barrier layer 14 of the fabric 10 may include an additional layer of the adhesive 24. As shown, the adhesive 24 is disposed on opposing sides of the intermediate material 26. Therefore, when the adhesive 24 is sufficiently heated the barrier layer 14 is bonded to both the interior layer 12 and the face layer 18. In addition, the adhesive 24 flows and fills a portion of the stitch holes 28 in the barrier layer 14 and the interior layer 12. In an embodiment, the adhesive 24 found on either side of the intermediate material 26 is the same type and, as such, has the same melting point. In FIG. 3, the barrier layer 14 may be referred to as having an "A-B-A" type format.

Figure 4:
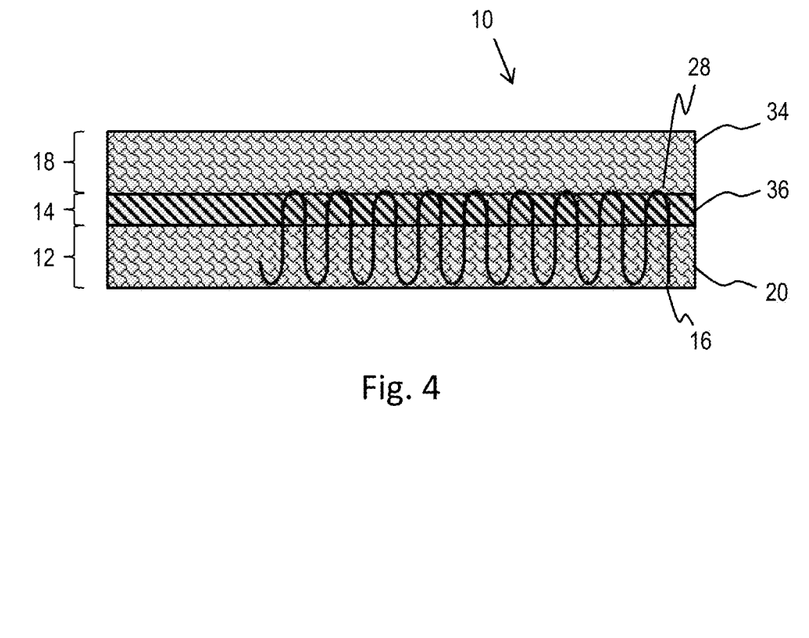
FIG. 4 is a cross section of an embodiment of the stitched multi-layer fabric of FIG. 1 where the barrier layer is formed solely from a meltable water-resistant film.

Referring now to FIG. 4, in an embodiment the barrier layer 14 of the fabric 10 is formed from an adhesive film 36 (e.g., a polymer-based adhesive film). In such an embodiment, the barrier layer 14 is formed from a single material. When the adhesive film 36 is sufficiently heated, upper and lower portions of the adhesive film 36 (i.e., portions adjacent the face layer 18 and the interior layer 12) melt and fill a portion of the stitch holes 28. In an embodiment, the adhesive film 36 is stretchable to a degree corresponding to the stretch provide by the interior layer 12 and the face layer 18.

Figures 5, 6:
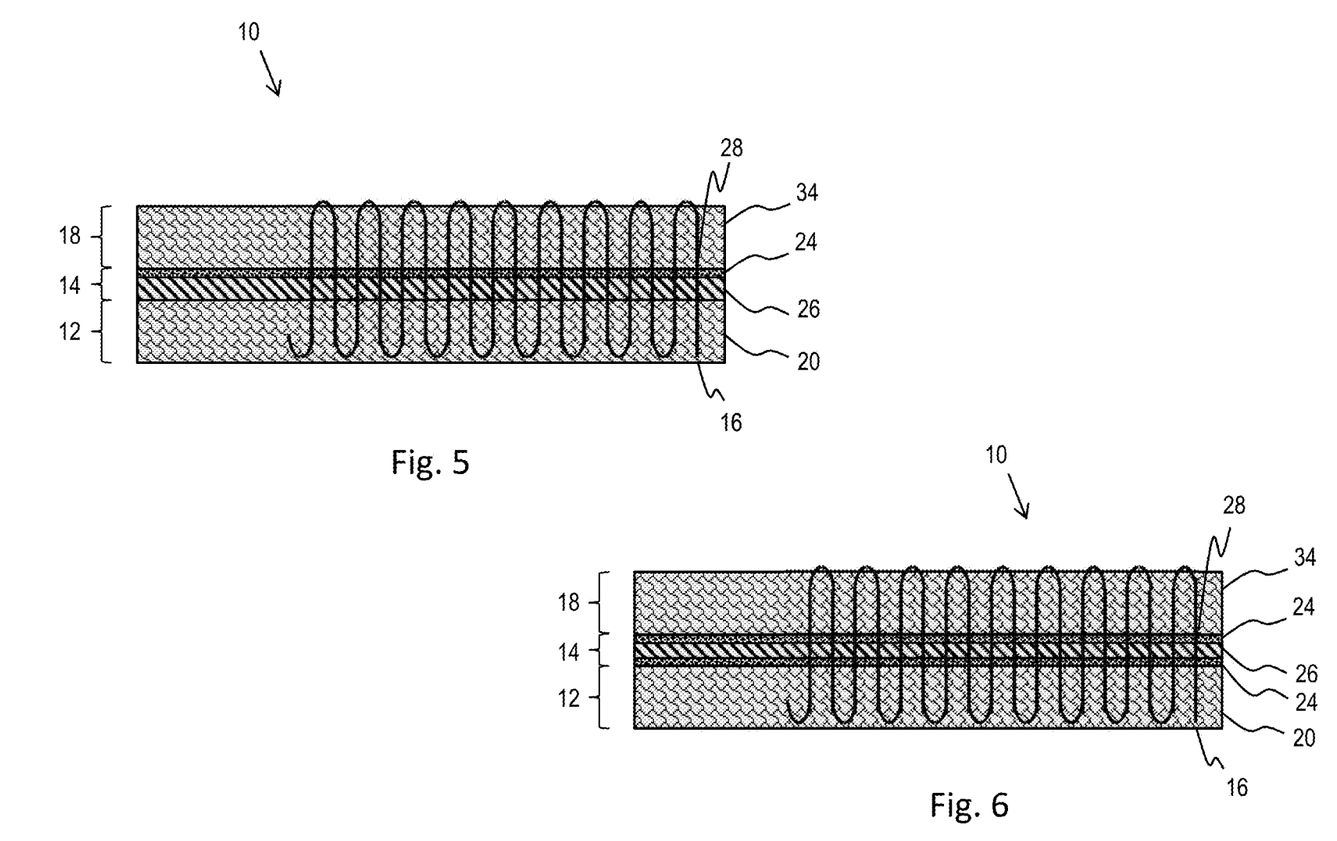
FIG. 5 is a cross section of an embodiment of the stitched multi-layer fabric of FIG. 1 where the yarn has been stitched through each of the layers.
FIG. 6 is a cross section of an embodiment of the stitched multi-layer fabric of FIG. 3 where the yarn has been stitched through each layer.
Figure 7:
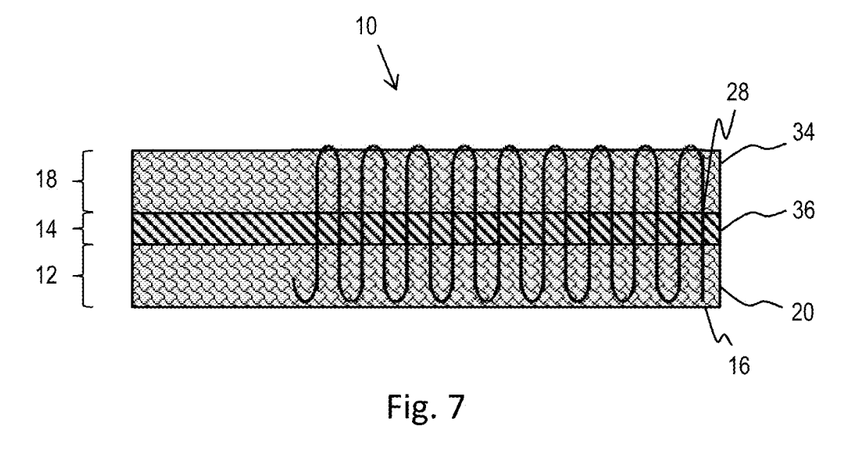
FIG. 7 is a cross section of an embodiment of the stitched multi-layer fabric of FIG. 4 where the yarn has been stitched through each layer.

Moving on to FIG. 5, in an embodiment the yarn 16 is stitched through each of the interior layer 12, the barrier layer 14, and the face layer 18. In addition, a barrier layer 14 comprising an intermediate material 26 (e.g., a porous membrane or a non-porous film) and an adhesive 24. As shown in FIG. 6, the yarn 16 is again stitched through all three of the layers 12, 14, 18. However, the barrier layer 14 includes the intermediate material 26 disposed between two layers of the adhesive 24. As shown in FIG. 7, a single material (e.g., adhesive film 36) is used for the barrier layer 14 while the yarn 16 is stitched through the layers 12, 14, 18.

Figure 8:
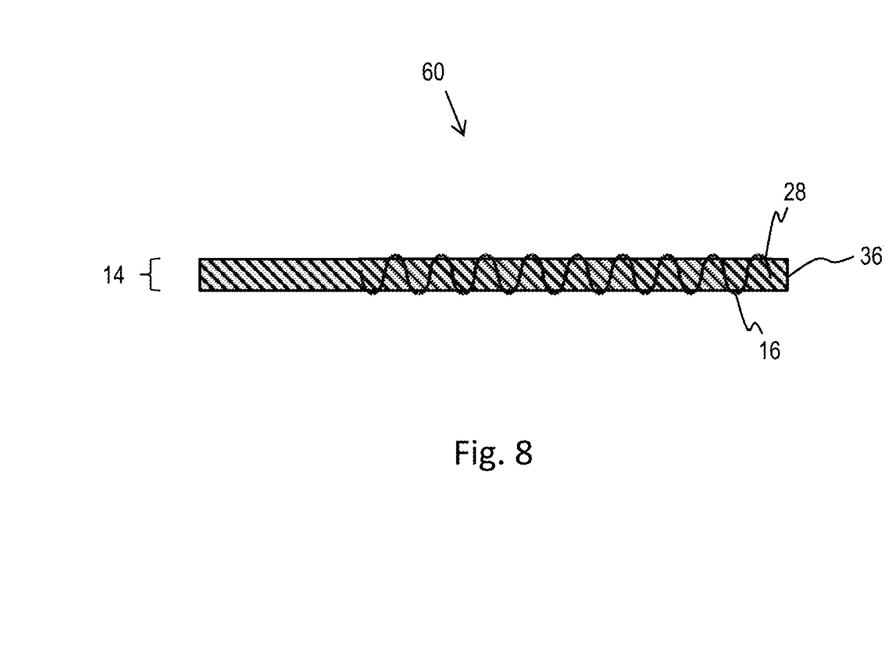
FIG. 8 is an embodiment of a stitched single-layer fabric free of an interior layer and a face layer found in the stitched multi-layer fabric of FIG. 1.

Referring now to FIG. 8, in an embodiment a single-layer stitched fabric 60 may be formed. As shown in FIG. 8, the fabric 60 is free of a face layer 18 and an interior layer 12. In other words, the face layer 18 and the interior layer 12 of the multi-layer stitched fabric 10 have been eliminated. As such, the yarn 16 and the barrier layer 14 are free from contact by another layer on either side of the barrier layer. In an embodiment, the barrier layer 14 comprises the adhesive film 36 that, when melted, will fill a portion of the stitch holes formed in the barrier layer 14 by the yarn 16.

In various embodiments, the single-layer stitched fabric 60 may share one or more of the characteristics or features disclosed herein with regard to the multi-layer stitched fabric 10. For example, in an embodiment the barrier layer 14 may be a water resistant or waterproof material such as, for example, the adhesive 24 and/or intermediate layers 26 used in the multi-layer stitched fabric 10 (FIG. 6). In addition, in an embodiment the yarn 16 used in the single-layer fabric 60 may be contractible or non-contractible.

Figure 9:
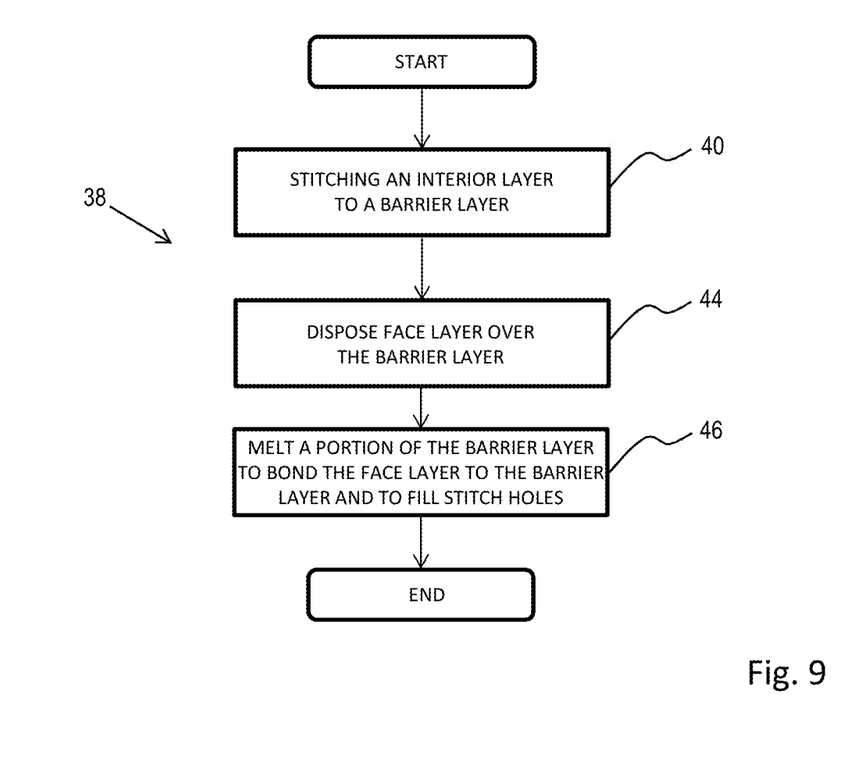
FIG. 9 is an embodiment of a method of forming the stitched multi-layer fabric of FIG. 1.
Figure 11:
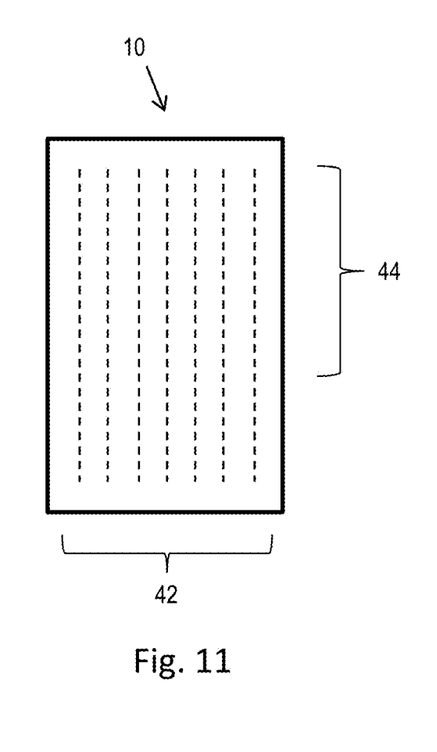
FIG. 11 is an embodiment of a stitch pattern for the stitched multi-layer fabric of FIG. 1.

In FIG. 9, a method 38 of forming the stitched multi-layer fabric 10 is illustrated. In block 40, the interior layer 12 is stitched to the barrier layer 14. As shown in FIG. 11, in an embodiment seven needles 40 per inch and fourteen courses 42 per inch are used in the stitching process.

Referring back to FIG. 9, in block 44 the face layer 18 is disposed over the barrier layer 14 after the stitching process has been completed. Thereafter, in block 46, a portion of the barrier layer 14 is melted to bond the face layer 18 to the barrier layer 14 and to fill a portion of the stitch holes 28 formed in the barrier layer during stitching.

In an embodiment, the barrier layer 14 is heated to or above about 140° C. (about 284° F.) to melt, for example, the adhesive 24 but not the intermediate material 26. In another embodiment, the barrier layer 14 is heated to between about 140° C. to about 180° C. (about 284° F. to about 356° F.) to melt, for example, the adhesive 24 but not the intermediate material 26. In yet another embodiment, the barrier layer 14 is heated to a temperature less than a set temperature of the interior layer 12 or the face layer 18, which may be about 360° C. (about 680° F.) or less depending on the materials used for those layers. In other embodiments, depending on the materials used the barrier layer 14 may be otherwise heated to a greater or lesser temperature.

Figure 10:
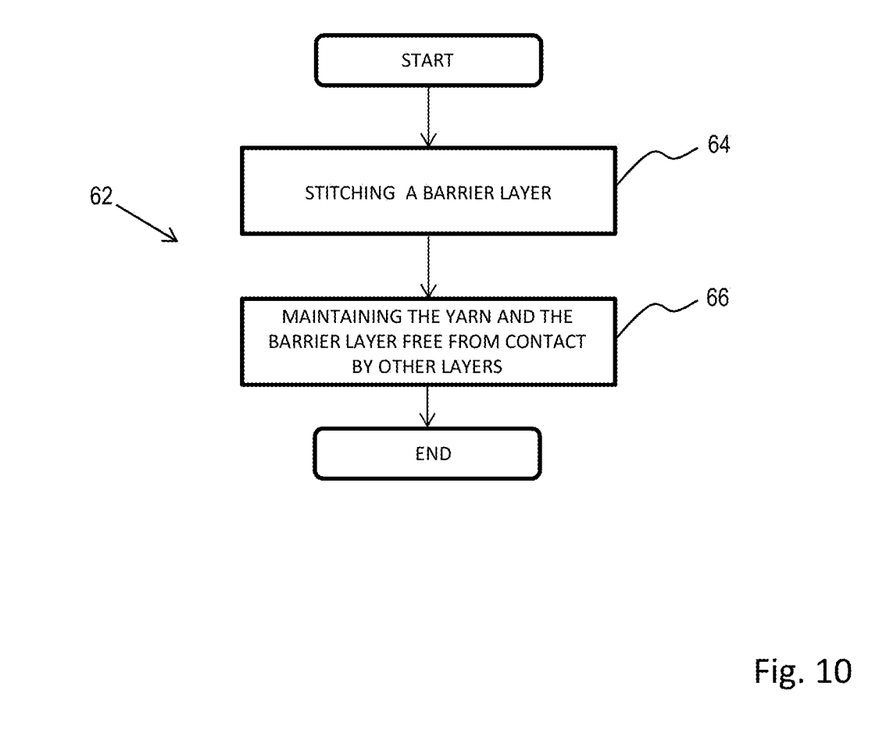
FIG. 10 is an embodiment of a method of forming the stitched multi-layer fabric of FIG. 8.

In FIG. 10, a method 62 of forming the stitched single-layer fabric 10 is illustrated. In block 64, the barrier layer 14 is stitched with the yarn 16. The yarn 16 may protrude from one or both surfaces (i.e., the top and bottom surfaces) of the barrier layer 14 after the stitching process. In addition, the yarn 16 may be stitched in a variety of different plain or patterned configurations and from more than one direction (e.g., top to bottom, left to right, diagonally, and so on). Moreover, the yarn 16 may be stitched in several passes whereby later-stitched portions of the yarn 16 are stitched over previously-stitched portions of the yarn 16.

In an embodiment, the yarn 16 may be stitched into the barrier layer 14 in such an amount that the barrier layer 14 is not visible or only slightly visible apart from the yarn 16. In addition, the amount of yarn 16 used in the stitching process may depend on numerous factors such as, for example, the desired weight of the finished fabric 60, the cost of the yarn 16, the type of the yarn used, the size of the yarn 16, the overall look and feel of the finished fabric 60, and so on.

In block 66, the yarn 16 and the barrier layer 14 are maintained free from contact by another layer (e.g., the interior layer 12 and the face layer 18) on either side of the barrier layer. In an embodiment, the method 62 may also include melting a portion of the barrier layer 14 to fill stitch holes formed in the barrier layer during stitching as described above with regard to fabric 10.

Figure 12:
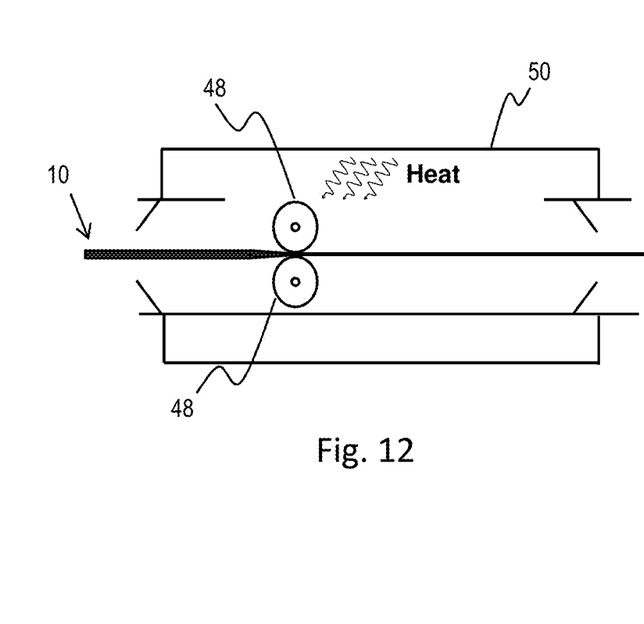
FIG. 12 is an embodiment of a heating device used to heat the barrier layer of the stitched multi-layer fabric of FIG. 1 and the stitched single-layer fabric in order to promote lamination.

Referring to FIG. 12, in an embodiment a portion of the barrier layer 14 is melted by feeding the fabric 12 through a pair of nip laminators 48 disposed in an oven 50. In an embodiment, the fabric 10 is moved through the oven 50 at approximately five yards per minute and at a temperature of approximately 180° C. (284° F.). The gap between opposing nip laminators 48 may be varied to subject the layers 12, 14, 18 to more or less pressure. Other settings and parameters may be used during the heating and/or melting process involving, for example, the nip laminators 48 and the oven 50.

In some embodiments, the fabric 10 or the individual layers 12, 14, 18 may undergo additional processing or treatment to impart desirable characteristics, qualities, or traits. For example, the interior and face layers 12, 18 or the fabric 10 may be dyed or treated with a fabric softener. In addition, an antimicrobial may also be sprayed onto the layers 12, 18 or the fabric 10. In addition, a finish that makes the layers 12, 18 or the fabric 10 water repellant or that encourages wicking may be applied.

Examples of illustrative embodiments are provided in the following paragraphs:

Example 1

In one example, the fabric 10 of FIG. 1 (with heat as Shown in FIG. 10) was constructed using a face layer 18 formed from woven wool face (57% wool/37% nylon/6% Spandex), a barrier layer 14 formed from a 3 mil urethane adhesive film (Stephens ST3995), and an interior layer 12 formed from wool pile (75.5% wool/24.5% black textured polyester). The yarn 16 was a 40 denier 13 black nylon air covered over 70 denier clear Spandex. The fabric 10 was heated to 180° C. and run through the oven at 5 meters per minute with a 2 mm gap/tunnel height.

The fabric 10 of FIG. 1 was tested under ASTM D-751 Procedure B Water Resistance and provided a result of 27.3 centimeters. In addition, the fabric 10 of FIG. 1 was tested under ASTM D-737 Air Perm and provided a result of 5.15 cubic feet per square foot per minute ($ft^3/ft^2/min$).

Example 2

In one example, the fabric 10 of FIG. 5 (with heat as Shown in FIG. 10) was constructed using a face layer 18 formed from woven wool face (57% wool/37% nylon/6% Spandex), a barrier layer 14 formed from a 3 mil urethane adhesive film (Stephens ST3995), and an interior layer 12 formed from wool pile (75.5% wool/24.5% black textured polyester). The yarn 16 was a 40 denier 13 black nylon air covered over 70 denier clear Spandex. The fabric 10 was heated to 180° C. and run through the oven at 5 meters per minute with a 2 mm gap/tunnel height.

The fabric 10 of FIG. 5 was tested under ASTM D-751 Procedure B Water Resistance and provided a result of 18.7 centimeters. In addition, the fabric 10 of FIG. 5 was tested under ASTM D-737 Air Perm and provided a result of 1.004 cubic feet per square foot per minute ($ft^3/ft^2/min$).

Example 3

In one example, the fabric 10 of FIG. 5 (without heat as Shown in FIG. 10) was constructed using a face layer 18 formed from woven wool face (57% wool/37% nylon/6% Spandex), a barrier layer 14 formed from a 3 mil urethane adhesive film (Stephens ST3995), and an interior layer 12 formed from wool pile (75.5% wool/24.5% black textured polyester). The yarn 16 was a 40 denier 13 black nylon air covered over 70 denier clear Spandex.

The fabric 10 of FIG. 5 was tested under ASTM D-751 Procedure B Water Resistance and provided a result of 15.2 centimeters. In addition, the fabric 10 of FIG. 5 was tested under ASTM D-737 Air Perm and provided a result of 3.47 cubic feet per square foot per minute ($ft^3/ft^2/min$).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A stitched fabric, comprising:
   a barrier layer configured to inhibit fluid flow, wherein no part of the barrier layer is folded; and
   a yarn stitched through and forming stitch holes in the barrier layer, wherein the yarn and the barrier layer are free from contact by another layer on either side of the barrier layer, wherein a portion of the yarn outside the stitch holes is free from contact with the barrier layer, and wherein a melted portion of the barrier layer fills a portion of the stitch holes in the barrier layer.

2. The fabric of claim 1, wherein the barrier layer comprises a first material with a first melting point and a second material with a second melting point, the first melting point lower than the second melting point.

3. The fabric of claim 2, wherein the first material is an adhesive and the second material is a porous membrane.

4. The fabric of claim 2, wherein the first material is an adhesive and the second material is a non-porous film.

5. The fabric of claim 2, wherein the barrier layer comprises a third material, the third material and first material disposed on opposing sides of the second material.

6. The fabric of claim 5, wherein the first material and the third material are each an adhesive with the first melting point.

7. The fabric of claim 1, wherein the barrier layer comprises an adhesive film.

8. The fabric of claim 1, wherein the barrier layer is a polymer-based adhesive film.

9. The fabric of claim 1, wherein the yarn is a non-contractible yarn.

10. The fabric of claim 1, wherein the yarn is a contractible yarn.

11. The fabric of claim 1, wherein the yarn is a nylon-wrapped spandex.

12. The fabric of claim 1, wherein the another layer is a face layer.

13. The fabric of claim 1, wherein the another layer is an interior layer.

14. The fabric of claim 1, wherein the barrier layer is not visible.

15. The fabric of claim 1, wherein the melted portion of the barrier layer is in direct contact with the yarn.

16. A stitched fabric, comprising:
a barrier layer, wherein the barrier layer is one of water resistant and waterproof, and wherein no part of the barrier layer is folded; and
a yarn extending through stitch holes in the barrier layer, wherein the barrier layer is adhered to the yarn, wherein the yarn and the barrier layer are free from contact by another layer on either side of the barrier layer, wherein a portion of the yarn visibly protruding from at least one exterior surface of the barrier is free from contact with the barrier layer, and wherein a melted portion of the barrier layer fills a portion of the stitch holes in the barrier layer.

17. The stitched fabric of claim 16, wherein the barrier layer comprises a first material with a first melting point and a second material with a second melting point, the first melting point lower than the second melting point, wherein the first material is adhered to the yarn.

18. The stitched fabric of claim 16, wherein the yarn is non-contractible.

19. The stitched fabric of claim 16, wherein the barrier layer comprises a porous membrane.

* * * * *